July 14, 1942.  T. O. KOSATKA  2,289,659

OIL SEAL CONSTRUCTION

Filed Dec. 8, 1941

INVENTOR.

Thomas O. Kosatka,
by Parkinson & Lane Attys.

Patented July 14, 1942

2,289,659

UNITED STATES PATENT OFFICE 2,289,659

OIL SEAL CONSTRUCTION

Thomas O. Kosatka, Chicago, Ill., assignor to Victor Manufacturing & Gasket Company, Chicago, Ill., a corporation of Illinois Application December 8, 1941, Serial No. 422,080

2 Claims. (Cl. 288—3)

The present invention relates to a novel oil or fluid seal having a standardized construction of sealing element which may be readily and simply mounted in a retaining shell to form a unitary, completed seal for effectively sealing the space between a rotatable shaft and its surrounding or enclosing housing.

The invention further comprehends a novel sealing element composed of a moldable plastic such as compounded synthetic rubber bonded or molded adjacent its one edge to a washer or ring of metal or the like adapted to cooperate with an inturned flange on the shell for securely anchoring the sealing element in position without the necessity of any auxiliary clamping means or the requirement of bonding this sealing element directly to the shell. This novel construction and arrangement provides a most simplified form of anchorage resulting in a decreased cost of production due to the fact that the sealing elements may be manufactured in large quantities for future use, and the further fact that the same sealing element may be assembled in retaining shells of varying diameters to meet the requirements of the spacing between the shaft and its enclosing housing.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

Figure 1:
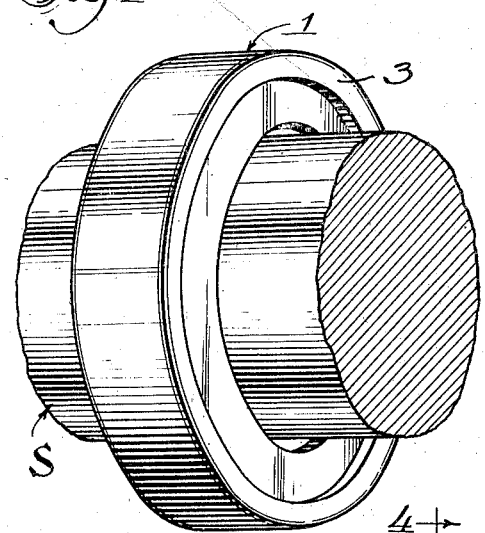
Figure 1 is a view in perspective of the novel seal surrounding a shaft for sealing the space between this shaft and its encompassing housing against the passage or escape of lubricants and other fluids as well as to seal against the entrance of dust, dirt and other foreign particles.
Figure 2:
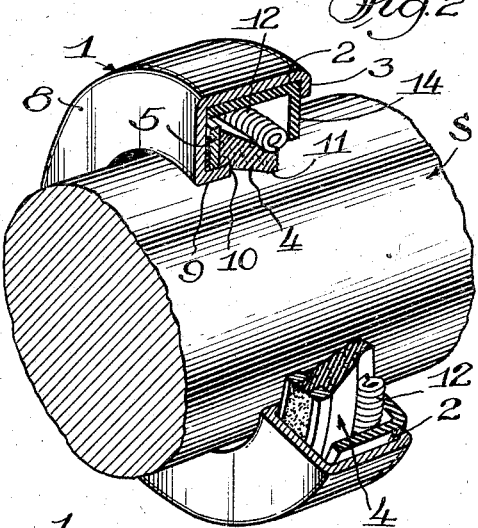
Figure 2 is another perspective view of the structure of Figure 1 with a portion of the seal cut away to more clearly disclose the interior construction.
Figure 3:
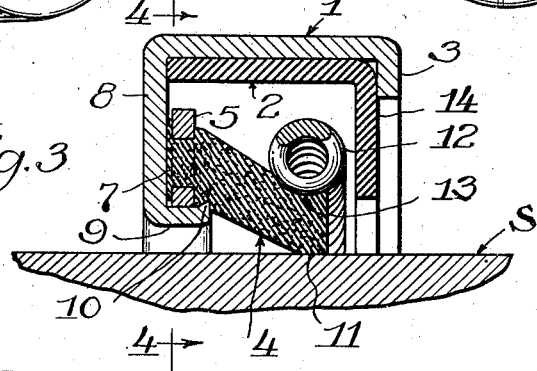
Figure 3 is an enlarged view in vertical cross section taken through the oil seal.
Figure 4:
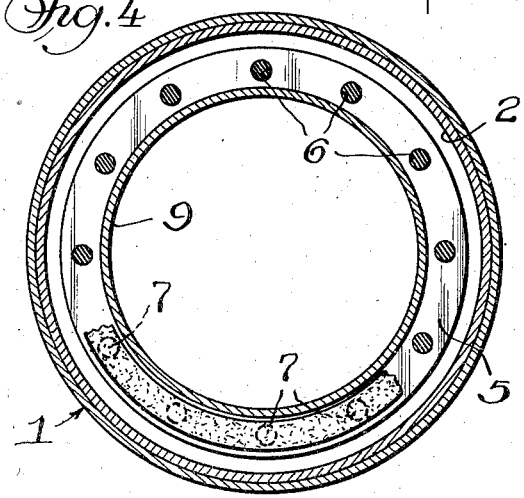
Figure 4 is a view in vertical cross section taken in a plane represented by the line 4—4 of Figure 3.
Figure 5:
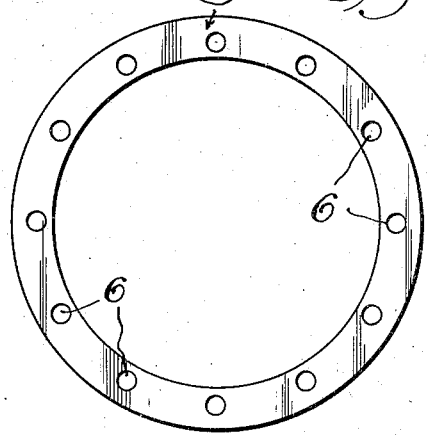
Figure 5 is a view in side elevation of the anchoring ring or washer.

Referring more particularly to the illustrative embodiment of the invention shown in the drawing, the novel oil seal comprises a substantially channel shaped retaining shell having an outer channel or section 1 and an inner channel or section 2 disposed in telescoped relation and united by means of a spun edge or lip 3. Within the retaining shell is anchored a sealing element or diaphragm 4 composed of a suitable plastic material such as compounded synthetic rubber which may be readily molded to the desired contour.

One edge of this sealing element is anchored or vulcanized to a retaining washer or ring 5 preferably provided with spaced openings 6 so that in the molding operation, the plastic material of the sealing element flows through these openings whereby it becomes thoroughly anchored to the washer or ring, with the exuded plastic at 7 providing a most effective seal against the inner face of the side wall 8 of the outer channel or retaining section 1. This washer or ring 5 is of such a depth as to extend beyond the opposite faces of the sealing element 4 in such manner that the sealing element or diaphragm 4 may be accurately positioned therein and centered when mounted in the retaining shell and anchored thereat by spinning or curling the flange or lip 9 of the side wall 8. The free edge 10 of this lip or flange is shown as inturned and imbedded within the sealing element to thereby additionally seal and prevent the passage of any oil or other fluid around or between the sealing element and the abutting surfaces of the structure of the shell.

The free edge 11 of the sealing element or diaphragm is adapted to form a continuous wiping and sealing contact with the shaft S at all times whether the shaft is rotating or stationary. In order to maintain such sealing contact under all conditions, a contractile or garter spring 12 is provided and retained in seating contact with the free end of the sealing element or diaphragm 4 by locating it within a recess 13 formed in the rear face of this sealing element. The side wall 14 of the inner channel or retaining section 2 prevents this spring from becoming detached or accidentally removed.

From the above description and the disclosure in the drawing, it will be evident that the invention comprehends a most effective fluid seal and one in which the sealing element or diaphragm may be standardized and completely fabricated in large quantities and stored for future use. Although the drawing shows the invention as embodied in an internal type seal in which the sealing contact is made with the rotatable shaft, it will be clearly apparent that the invention is applicable to an external type seal in which the retaining shell is mounted on the shaft and continuous sealing contact is had with the surrounding housing.

Having thus disclosed the invention, I claim:

1. A fluid seal for sealing a pair of members such as a rotatable shaft and its encompassing housing, comprising a retaining shell, a standardized sealing element composed of a moldable and resilient plastic, a continuous metal ring embedded in the moldable plastic adjacent one edge thereof with the opposite edges of the ring extending beyond the opposite faces of said plastic, said ring having openings in which the plastic is anchored and through which the plastic extends for sealing contact with the inner surface of a side wall of the shell, and an inwardly projecting lip on said side wall projecting within and in radial pressure engagement with said ring for anchoring said ring and sealing element in predetermined position within the shell and forming a sealing contact thereat.

2. A fluid seal for sealing a pair of members such as a rotatable shaft and its encompassing housing, comprising an annular channel-shaped retaining shell, a standardized sealing element composed of a moldable resilient plastic and a continuous metal ring to which the sealing element is bonded, and an inturned lip on a side wall of said shell in radial pressure engagement with said metal ring for anchoring said metal ring and sealing element within the shell without the use of any auxiliary anchoring means.

THOMAS O. KOSATKA.